(12) United States Patent
Zheng et al.

(10) Patent No.: US 11,663,484 B2
(45) Date of Patent: May 30, 2023

(54) CONTENT GENERATION METHOD AND APPARATUS

(71) Applicant: ALIBABA GROUP HOLDING LIMITED, George Town (KY)

(72) Inventors: Qunmeng Zheng, Hangzhou (CN); Jianxing Xiao, Hangzhou (CN); Zhiqiang Zhang, Beijing (CN); Yongliang Wang, Beijing (CN); Mu Li, Beijing (CN); Yangjian Chen, Hangzhou (CN); Yuqi Chen, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1173 days.

(21) Appl. No.: 16/231,362

(22) Filed: Dec. 21, 2018

(65) Prior Publication Data

US 2019/0205750 A1 Jul. 4, 2019

(30) Foreign Application Priority Data

Dec. 29, 2017 (CN) .......................... 201711473163.1

(51) Int. Cl.
*G06N 3/08* (2006.01)
*G06N 3/04* (2006.01)
(Continued)

(52) U.S. Cl.
CPC .......... *G06N 3/084* (2013.01); *G06N 3/0445* (2013.01); *G06Q 30/0276* (2013.01); *G06Q 30/0277* (2013.01)

(58) Field of Classification Search
CPC .. G06N 3/084; G06N 3/0445; G06Q 30/0276; G06Q 30/0277
See application file for complete search history.

(56) References Cited

U.S. PATENT DOCUMENTS 6,266,664 B1 * 7/2001 Russell-Falla ...... G06F 16/9535
707/999.005
9,619,735 B1 * 4/2017 Lineback ............. G06V 10/751
(Continued)

FOREIGN PATENT DOCUMENTS

CN 110998565 A * 4/2020 ........... G06F 16/434
WO WO-2013157603 A1 * 10/2013 ....... G06F 17/30598
(Continued)

OTHER PUBLICATIONS

PCT International Search Report and Written Opinion dated Apr. 1, 2019, issued in corresponding International Application No. PCT/US18/67382 (9 pgs.).

*Primary Examiner* — Mohammad K Islam
(74) *Attorney, Agent, or Firm* — Finnegan, Henderson, Farabow, Garrett & Dunner, LLP

(57) ABSTRACT

Embodiments of the present application disclose a content generation method and apparatus. The method includes: acquiring product description information; selecting, by using a deep neural network model component, a content phrase matched with the product description information, wherein the deep neural network model component is obtained by training according to a plurality of pieces of historical product description information and historical content of the historical product description information; and generating content corresponding to the product description information based on the selected content phrase.

15 Claims, 7 Drawing Sheets

(51) Int. Cl.
*G06Q 30/02* (2012.01)
*G06N 3/084* (2023.01)
*G06Q 30/0241* (2023.01)

(56) References Cited

U.S. PATENT DOCUMENTS

| | | | |
|---|---|---|---|
| 10,565,498 B1* | 2/2020 | Zhiyanov | G06N 7/005 |
| 11,106,690 B1* | 8/2021 | Dhillon | G06N 5/003 |
| 2012/0215776 A1* | 8/2012 | Guha | G06F 16/951 |
| | | | 707/E17.064 |
| 2015/0278341 A1* | 10/2015 | Shen | G06Q 30/0277 |
| | | | 707/730 |
| 2016/0323398 A1* | 11/2016 | Guo | H04L 67/535 |
| 2017/0127016 A1* | 5/2017 | Yu | G06V 10/82 |
| 2017/0162203 A1 | 6/2017 | Huang et al. | |
| 2017/0323636 A1* | 11/2017 | Xiao | G06F 16/332 |
| 2020/0356653 A1* | 11/2020 | Cho | G06N 3/08 |
| 2021/0201351 A1* | 7/2021 | Nag | G06Q 30/0256 |

FOREIGN PATENT DOCUMENTS

| | | | | |
|---|---|---|---|---|
| WO | WO-2015039165 A1 * | 3/2015 | | G06F 16/951 |
| WO | WO 2019/133545 A2 | 7/2019 | | |

\* cited by examiner

Content Generation Apparatus 700

CONTENT GENERATION METHOD AND APPARATUS

CROSS REFERENCE TO RELATED APPLICATION

The disclosure claims the benefits of priority to Chinese application number 201711473163.1, filed Dec. 29, 2017, which is incorporated herein by reference in its entirety.

BACKGROUND

In the digital age, the use of digital content provided on, for example, social media, selected media, and news apps have been extremely prominent. And it is expected that the market share for digital content (when compared to physical content such as newspapers) will continue to increase in the future. Accordingly, the volume of content may also continue to increase subsequently. To effectively convey information that meets the needs of the target audience, it is necessary to quickly make a large amount of diversified creative content for distribution.

SUMMARY OF THE DISCLOSURE

The objective of embodiments of the present application is to provide a document generation method and apparatus, which can quickly generate content of a target product.

Embodiments of the disclosure provide a content generation method. The method may include: acquiring product description information; selecting, by using a deep neural network model component, a content phrase matched with the product description information, wherein the deep neural network model component is obtained by training according to a plurality of pieces of historical product description information and historical content of the historical product description information; and generating content corresponding to the product description information based on the selected content phrase.

Embodiments of the disclosure also provide a content generation apparatus. The apparatus may include: a memory storing a set of instructions; and at least one processor configured to execute the set of instructions to cause the apparatus to perform: acquiring product description information; selecting, by using a deep neural network model component, a content phrase matched with the product description information, wherein the deep neural network model component is obtained by training according to a plurality of pieces of historical product description information and historical content of the historical product description information; and generating content corresponding to the product description information based on the selected content phrase.

Embodiments of the disclosure further provide a non-transitory computer readable medium that stores a set of instructions that is executable by at least one processor of a computer system to cause the computer system to perform a content generation method. The method can include: acquiring product description information; selecting, by using a deep neural network model component, a content phrase matched with the product description information, wherein the deep neural network model component is obtained by training according to a plurality of pieces of historical product description information and historical content of the historical product description information; and generating content corresponding to the product description information based on the selected content phrase.

BRIEF DESCRIPTION OF THE DRAWINGS

To describe the technical solutions in the embodiments of the present application or the prior art more clearly, the accompanying drawings required for describing the embodiments or the prior art are briefly introduced below. It is apparent that the accompanying drawings described in the following are merely some embodiments of the present application, and those of ordinary skill in the art may still derive other drawings from these accompanying drawings without creative efforts.

DETAILED DESCRIPTION

Figure 1:
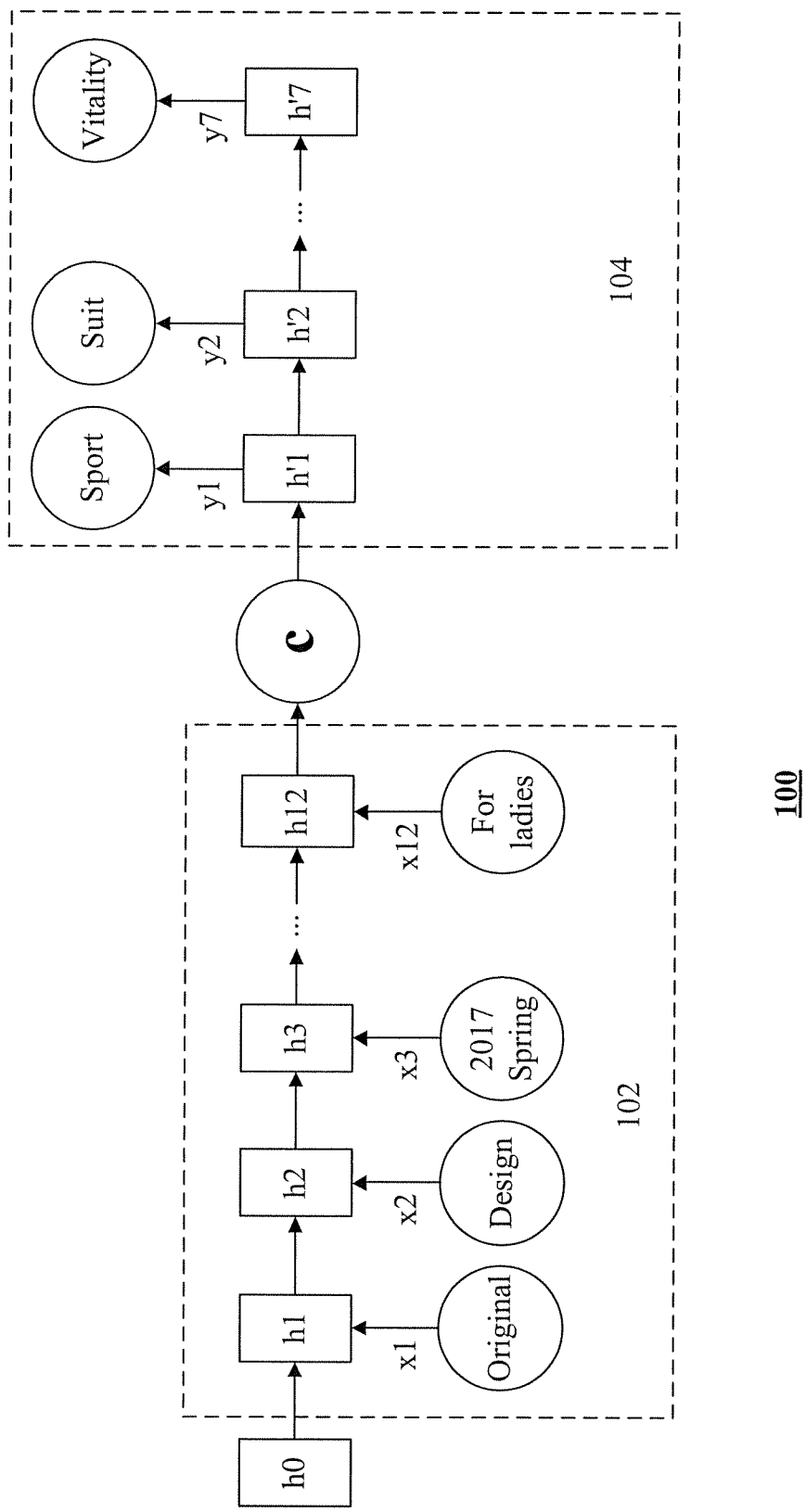
FIG. 1 is a schematic diagram of deep learning of historical product description information in a technical solution, according to embodiments of the present application.

In order to enable those skilled in the art to better understand the technical solutions in the present application, the technical solutions in the embodiments of the present application will be described clearly and completely with reference to the accompanying drawings in the embodiments of the present application. It is apparent that the described embodiments are merely some rather than all the embodiments of the present application. Based on the embodiments of the present application, all other embodiments derived by those of ordinary skill in the art without any creative effort shall all fall within the protection scope of the present application.

Based on the technical requirements similar to those described above, a content generation technology provided in the present application can eliminate the process of writing content manually. Based on a plurality of pairs of historical product description information and historical content, deep neural network learning can be carried out on the plurality of pairs of historical product description information and historical content to obtain a deep neural network model component by training. The deep neural network model component obtained by training can be used to construct content of product description information, which not only can quickly generate content of a product but also can ensure a degree of matching between the accuracy of the content and user requirements.

In some embodiments, a deep neural network model component can be used to carry out deep learning on a plurality of pieces of historical product description information and historical content of the historical product description information. Therefore, the deep neural network model component can be continually optimized to finally meet preset requirements (e.g., the value of a loss function is not greater than a preset threshold, etc.). As the historical product description information and the historical content of the historical product description information can contain certain requirements or rules, in some embodiments, the historical content can be used to generate a certain product access rate. In some embodiments, after content is displayed to users, some of the users may access product information associated with the content by, for example, clicking the content, adding it to favorite, generating transactions, and the like.

Table 1 below illustrates historical product description information and historical content corresponding to the historical product description information. As shown in Table 1, content of "Bedding that makes you love sleeping naked" is associated with product description information "Modern simplicity style, cotton, four-piece suit, cotton bedding, 1.8-m/1.5-m bed, cartoon 4-piece suit, bed sheets and quilt covers," and content of "The sport suit that allows you to release your vitality" is associated with product description information of "Original design, 2017 spring, loose and round-collar long-sleeved hoody+asymmetrical trousers, sport suit, for ladies." It is appreciated that, the above data of the product description information and historical content not only can be acquired from historical data of a platform, such as an e-commerce platform, but also can be provided according to human experience. Sources of the data are not limited in the present application.

TABLE 1

| | Product Description Information | Historical Content |
|---|---|---|
| 1 | Modern simplicity style, cotton, four-piece suit, cotton bedding, 1.8-m/1.5-m bed, cartoon 4-piece suit, bed sheets and quilt covers | Bedding that makes you love sleeping naked |
| 2 | Original design, 2017 spring, loose and round-collar long-sleeved hoody + asymmetrical trousers, sport suit, for ladies | The sport suit that allows you to release your vitality |
| 3 | Big red-bottle face cream set, skin source repair essence cream, anti-wrinkle firming 50 g/80 g | Suitable for mature skin, reduces fine lines |

By non-restrictively taking a Sequence to Sequence (seq2seq) model component in a deep neural network model component as an example, the process of carrying out deep learning on original product description information and historical content of the second product in Table 1 by using the seq2seq model component can be described as below. In some embodiments, deep learning can also be carried out on data by using a model component, such as a Pointer Network or a Pointer Generator. The model component used in embodiments of the application is not limited in the present application.

As shown in FIG. 1, a basic seq2seq model component 100 can include an encoder element 102 and a decoder element 104. The encoder element 102 and the decoder element 104 each can include a Recurrent Neural Network (RNN). In the encoder element 102, an input sequence can be transformed into a fixed-length context semantic vector. Correspondingly, in the decoder element 104, the context semantic vector can be used as an input of the decoder element 104 to generate an output sequence. As shown in FIG. 1, in the encoder element 102 of the seq2seq model component, the input can include a sequence {x1, x2, x3, . . . , x12} consisting of vectors of phrases in "Original design, 2017 spring, loose and round-collar long-sleeved hoody+asymmetrical trousers, sport suit, for ladies," wherein x1 corresponds to the vector of the phrase "original", x2 corresponds to the vector of the phrase "design," and so on. In FIG. 1, h1-h12 can be respectively expressed as hidden vectors respectively corresponding to the x1-x12 sequence. The hidden vectors can be provided with training parameters. After acquiring the sequence {x1, x2, x3, . . . , x12}, the encoder element 102 can process the sequence to generate a context vector c. The context vector c can be obtained from the transformation of the last hidden vector (e.g., h12) in the above hidden vectors. It is appreciated that, the context vector c can also be obtained from the transformation of any one or more of hidden vectors h1-h12, which is not limited in the present application. As shown in FIG. 1, each hidden vector is associated with a previous hidden vector of the hidden vector. Therefore, the last hidden vector h12 can include information of all the previous hidden vectors. That is, the context vector c can include all information in the sequence {x1, x2, x3, . . . , x12}.

As shown in FIG. 1, the context vector c can be input to the decoder element 104. The decoder element 104 can also include a RNN model component. The RNN model component can include a plurality of hidden vectors, such as hidden vectors h'1, h'2, h'3 and h'4. The decoder element 104 can transform the context vector c to an output sequence. The output sequence of the decoder element 104 should be a sequence including vectors of phrases in "The sport suit allows you to release sport vitality." However, under actual circumstances, the output sequence usually does not match the historical content. Therefore, the training parameters in the hidden vectors in the encoder element 102 and the decoder element 104 can be further adjusted until the output sequence matches with the historical content.

Figure 2:
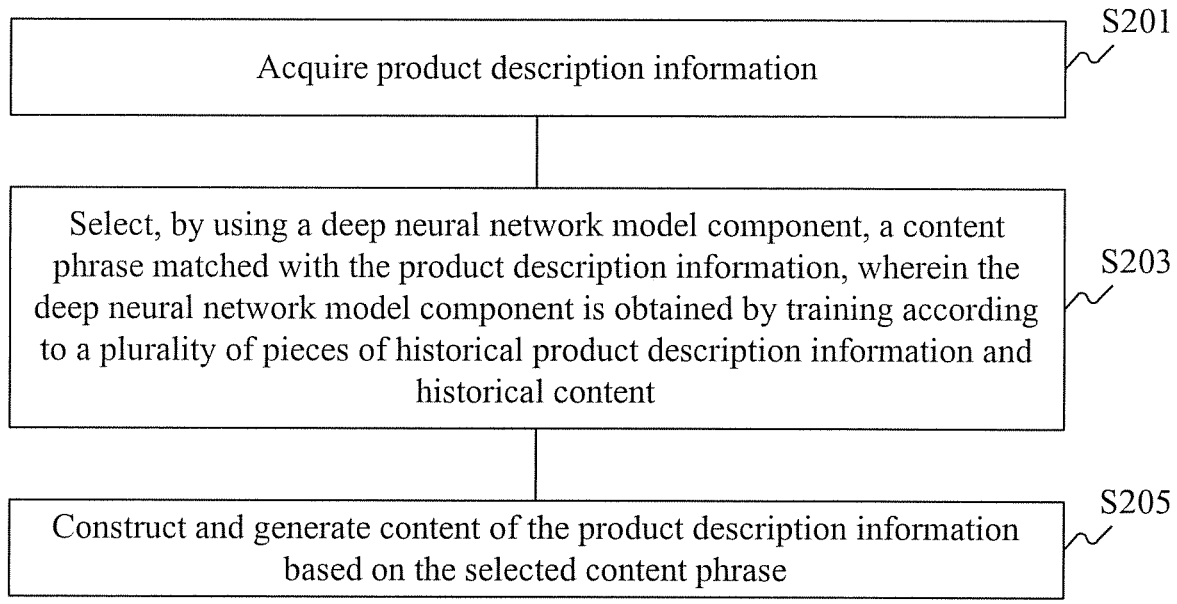
FIG. 2 is a schematic diagram of generation of an content for a target product by using Sequence to Sequence (seq2seq), according to embodiments of the present application.

FIG. 2 is a method flowchart of an exemplary content generation method, according to embodiments of the present application. Although the present application provides operation steps of the method as described in the following embodiments or drawing, the method can include more or fewer operation steps based on regular labor or without creative labor. An execution sequence of steps that have no necessary logical causality is not limited to the execution sequence provided in the embodiments of the present application. When the method is executed in an actual content generation process or apparatus, the steps can be executed based on a method order shown in the embodiments or the accompany drawing or can be executed concurrently (e.g., using parallel processors or in an environment of multi-thread processing).

As shown in FIG. 2, the content generation method can include steps S201-S205.

In step S201, product description information can be acquired.

In step S203, a content phrase matched with the product description information can be selected by using a deep neural network model component. The deep neural network model component can be obtained by training according to a plurality of pieces of historical product description information and historical content of the historical product description information.

In step S205, content of the product description information is constructed and generated based on the selected content phrase.

In some embodiments, historical data can be trained by using a deep neural network model component (e.g., a seq2seq model component). The historical data can include a plurality of pieces of historical product description information and historical content of the historical product description information. In some embodiments, the historical product description information can include detailed product description information, title information, label information of the product, and the like. In an example, the historical content can include a historical content that is selected from massive historical data that has a relatively high recall rate. That is, after content constructed and generated for a certain piece of historical product description information is displayed, a relatively high user access rate is obtained. The user access rate can include, for example, a user click rate, a user collection rate, a user transaction rate, etc. In other embodiments, the historical content can include other content set according to human experience, which is not limited in the present application.

In some embodiments, the seq2seq model component can transform one sequence into another sequence. The sequence can be expressed with vectors. The sequence can include a plurality of product phrases in the product description information. The seq2seq model component can include an encoder element and a decoder element. The encoder element and the decoder element each can include a RNN. In the encoder element, an input sequence can be transformed into a fixed-length context semantic vector. Correspondingly, in the decoder element, the fixed-length context semantic vector can be used as input data of the decoder element to generate an output sequence. Based on the above theory, at least one product phrase can be extracted from the historical product description information, and at least one product phrase forms a historical product phrase sequence. In the process of forming the historical product phrase sequence, the phrase can be converted into a vector, and the vector of the product phrase forms the historical product phrase sequence.

Figure 3:
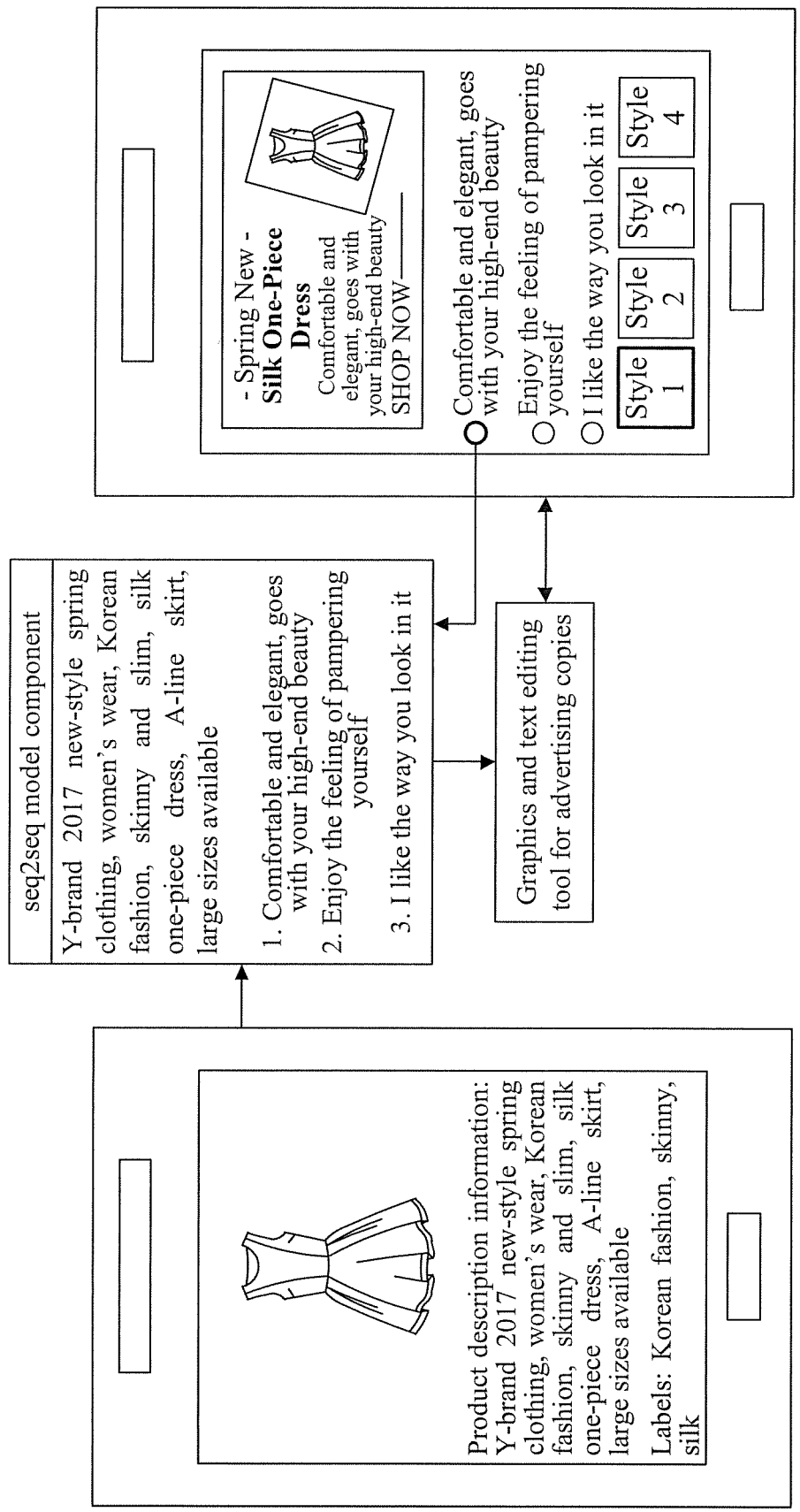
FIG. 3 is a schematic flowchart of an exemplary content generation method, according to embodiments of the present application.

FIG. 3 provides an example of content generation using seq2seq. In particular, FIG. 3 is a schematic diagram of generation of content for a target product by using seq2seq, according to embodiments of the present application. In an example, a merchant Xiao M needs to display content of a new dress on a homepage of a store website. To this end, Xiao M can automatically generate the content through an e-commerce platform client terminal. As shown in FIG. 3, Xiao M can input pictures, product description information, labels and other information on the dress in the client terminal. The product description information of the dress is "Y-brand 2017 new-style spring clothing, women's wear, Korean fashion, skinny and slim, silk one-piece dress, A-line skirt, large-sizes available", and the labels of the dress are "Korean fashion", "slim", "silk" and so on. In this example, the client terminal or a server terminal connected to the client terminal is provided with the trained seq2seq model component in FIG. 3. Therefore, the seq2seq model component can be used to generate the content of the dress.

As shown in FIG. 3, content can be generated by using the seq2seq model component: "Comfortable and elegant, goes with your high-end beauty," "Enjoy the feeling of pampering yourself," "I like the way you look in it," and the like. Similar to the above processing procedure, at least one product phrase can be extracted from the product description information on the dress. The product phrases can include "Y-brand," "2017," "new-style," "spring clothing," "women's wear," "Korean fashion," "skinny," "slim," "silk," "one-piece dress," "A-line skirt," and "large-sizes available." After the above product phrases are converted into vectors, the vectors are input into the encoder element in the form of a sequence. For example, the seq2seq model component extracts a historical product phrase sequence consisting of vectors of 12 phrases: "Y-brand," "2017," "new-style," "spring clothing," "women's wear," "Korean fashion," "skinny," "slim," "silk," "one-piece dress," "A-line skirt," and "large sizes available", from the historical product description information "Y-brand 2017 new-style spring clothing, women's wear, Korean fashion, skinny and slim, silk one-piece dress, A-line skirt, large sizes available" of a dress. It is found according to statistics on the historical data that after content "Comfortable and elegant, goes with your high-end beauty" is constructed and generated according to the above historical product description information, the dress obtains a relatively high user access rate. For example, many users click the product information, collect the product information or generate transactions for the product. Therefore, "Comfortable and elegant, goes with your high-end beauty" can be set as a historical content corresponding to "Y-brand 2017 new-style spring clothing, women's wear, Korean fashion, skinny and slim, silk one-piece dress, A-line skirt, large sizes available." Content phrases of the historical content can be extracted to obtain an content that includes vectors of 6 content phrases: "comfortable," "elegant", "goes with," "your," "high-end," and "beauty."

Figure 4:
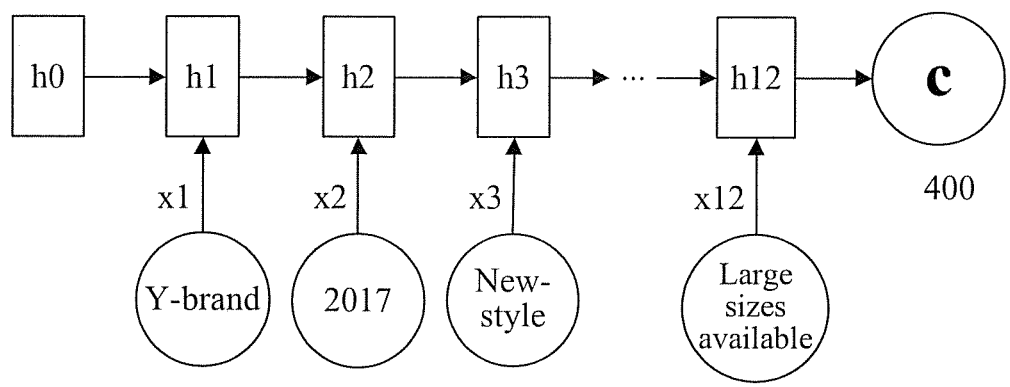
FIG. 4 is a schematic diagram of deep learning of historical product description information by using seq2seq, according to embodiments of the present application.

After generating a context vector c, the encoder sends the context vector c into a decoder element. As shown in FIG. 4, a decoder element 400 can obtain the content by calculation according to trained hidden vectors. The hidden vectors can include training parameters. The training parameters have been trained at a stage where the seq2seq model component is trained. It should be noted that in the process of generating the content, a content phrase sequence consisting of a plurality of single content phrases is output from the seq2seq model component. Then, the obtained content phrases can be input into a language model to generate content in accordance with a preset language rule. An exemplary processing manner can include language smoothing, removal of redundant information, and the like.

After the content is generated, the content can be displayed on a client terminal of Xiao M by using a graphics and text editing tool for content. As shown in FIG. 3, content can be displayed on a user interface of a client terminal, and users can make selections according to their preferences. In addition, the graphics and text editing tool for content can also provide a plurality of graphics and text styles for a user to select. The graphics and text editing tool for content can automatically edit the content and a graphics and text style that are selected by the user into a display interface as shown in FIG. 3. As shown in FIG. 3, Xiao M can select the content "Comfortable and elegant, goes with your high-end beauty" and the graphics and text style 1. The graphics and text editing tool for content can fill the content in a preset position which is used for displaying content and in the graphics and text style 1. Information, other than the content, can also be displayed on the graphics and text style 1, such as the title "Silk One-Piece Dress" and the subtitle "Spring NEW", and other user-defined marketing information or the like can also be displayed on the graphics and text style 1, which is not limited.

It should be noted that, after acquiring the content finally selected by the user Xiao M, the client terminal can feed back the content as historical data into the seq2seq model component for the seq2seq model component to further carry out deep learning. For example, Xiao M can finalize "Comfortable and elegant, goes with your high-end beauty" as the content of the dress. Then, in the process of training the seq2 seq model component, the encoder element can use "Y-brand 2017 new-style spring clothing, women's wear, Korean fashion, skinny and slim, silk one-piece dress, A-line skirt, large-sizes available" as historical product description information and "Comfortable and elegant, goes with your high-end beauty" as a historical content to carry out subsequent deep learning.

In some embodiment, as shown in FIG. 4, the historical product phrase sequence "Y-brand," "2017," "new-style," "spring clothing," "women's wear," "Korean fashion," "skinny," "slim," "silk," "one-piece dress," "A-line skirt," and "large sizes available" are used as input data of the encoder of the seq2seq model component. As shown in FIG. 4, x1-x12 can represent vectors of 12 product phrases in the above historical product phrase sequence respectively, and h1-h12 can respectively represent hidden vectors respectively corresponding to the x1-x12. As shown in FIG. 2, the historical product phrase sequence can be transformed into a context vector c. The context vector c can be obtained from the transformation of the last hidden vector (e.g., h12) in the above hidden vectors. It is appreciated that, the context vector c can also be obtained from the transformation of any one or more of h1-h12, which is not limited in the present application.

Figure 5:
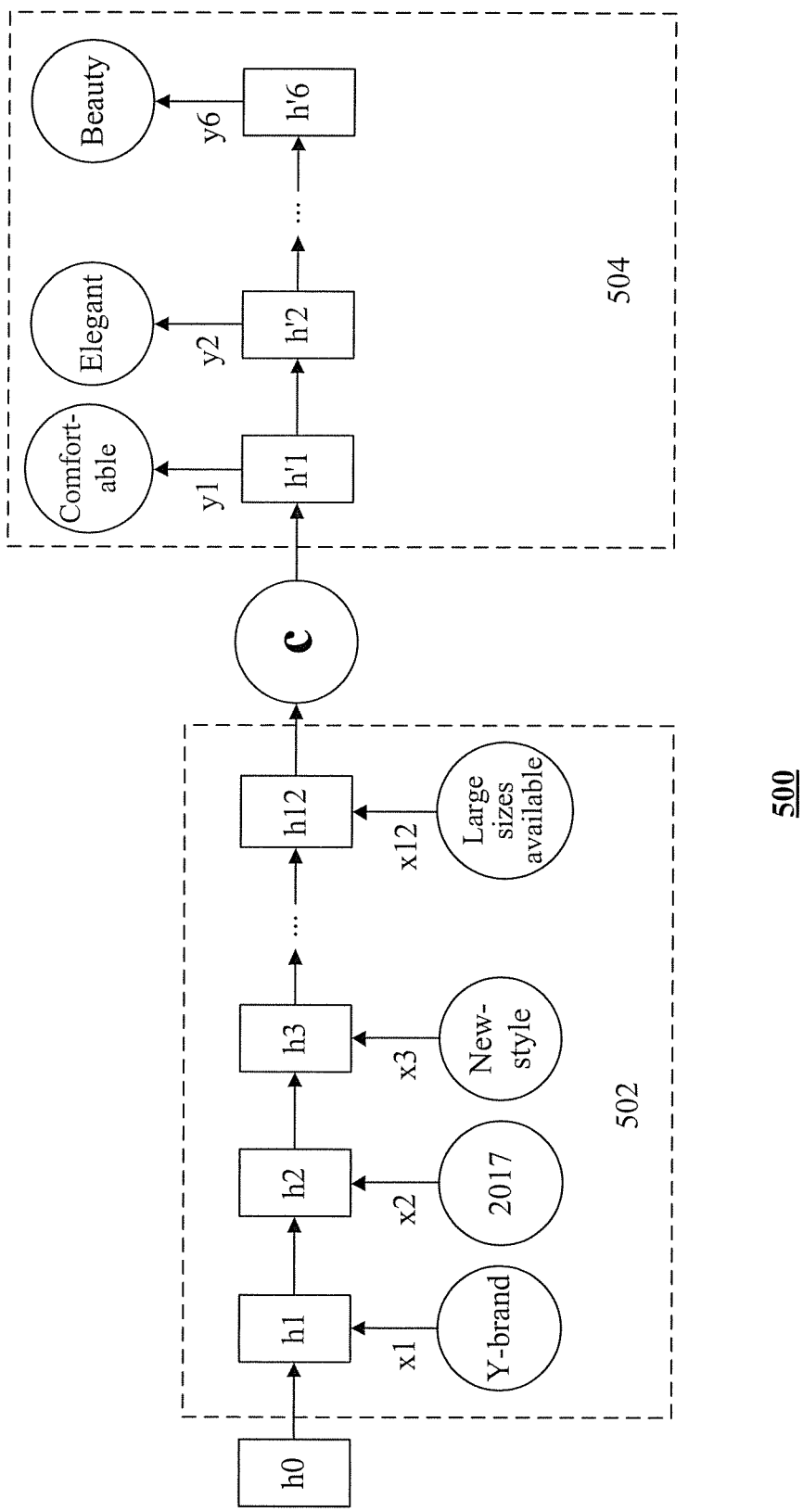
FIG. 5 is a schematic diagram of deep learning of historical product description information by using seq2seq, according to embodiments of the present application.

In some embodiments, after the context vector c is acquired, as shown in FIG. 5, the context vector c can be input into the decoder element 504 of the seq2seq model component. After acquiring the context vector c, the decoder element 504 can use another RNN to convert the context vector c to generate an output sequence of y1-y6. In an ideal state, it is hoped that the output sequence of y1-y6 is just a content phrase vector sequence corresponding to the historical content phrase sequence "comfortable", "elegant", "goes with", "your", "high-end", and "beauty." At first, it is difficult to match the output sequence of y1-y6 with the historical content phrase sequence. Therefore, training parameters in the hidden vectors (including the hidden vectors in the encoder element 502 and the decoder element 504) can be adjusted. The above steps are repeated until an output sequence matched with the phrase sequence can be output and reconstructed in the decoder element 504.

According to the content generation method, deep learning can be carried out on a plurality of pieces of historical product description information and historical content of the historical product description information to construct a deep neural network model component. As such, the deep neural network model component can be directly used to quickly generate content of a target product. Therefore, embodiments of the present application can save resources and provide customized output based on the incoming sequence data. In addition, on one hand, for a user client terminal, the display of the content of the product can be accelerated; on the other hand, through deep learning of a large amount of historical data, the content acquired by using the deep neural network model component is more in line with the requirements of users, thus improving the users' sense of experience.

Figure 6:
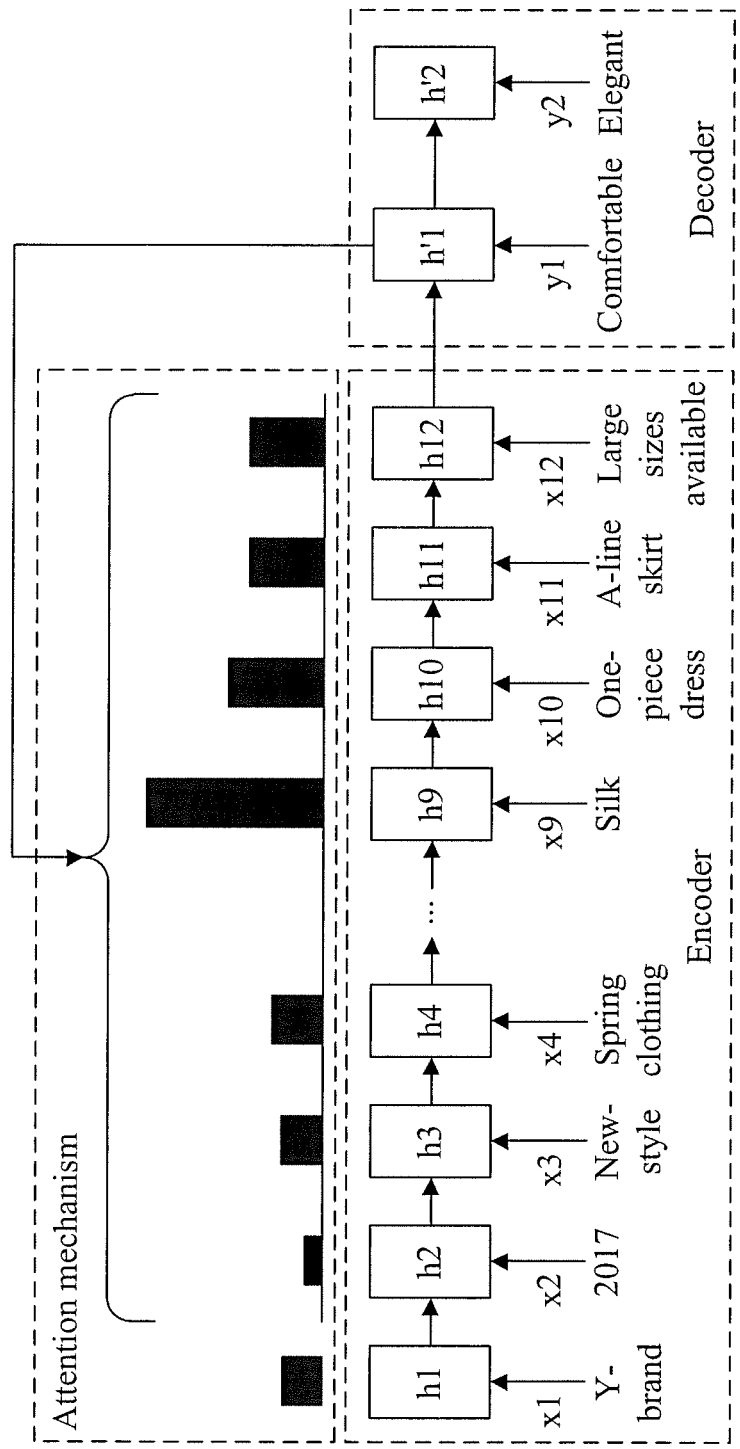
FIG. 6 is a schematic diagram of deep learning of historical product description information by using seq2seq, according to embodiments of the present application.

It can be known from the above that, in the encoding process, the historical product phrase sequence corresponding to the historical product description information can be transformed into a fixed-length context semantic vector. The context vector is obtained from the transformation of the hidden vector corresponding to the last phrase. Then, it can be considered that the context vector is highly correlated with the last phrase in the historical product phrase sequence but is little correlated with the previous phrases. In addition, in an actual decoding process, with constant output of the vectors of the content phrases, degrees of correlation between content phrase vectors and various product phrases in the historical product phrase sequence also change. In order to enable the seq2seq model component to focus more on finding useful information that is significantly related to current content phrase vectors and in the historical product phrase sequence, in some embodiments of the present application, an Attention mechanism can be further added to the seq2seq model component. In the Attention mechanism, at every step in the decoding process, the value of a degree of correlation between an output content vector and the vector of each product phrase in the historical product phrase sequence is calculated once. In this embodiment, when a degree of correlation between a vector of a certain product phrase and an output content vector is greater (that is, the value of the degree of correlation is greater), a weight value of the vector of the corresponding product phrase can be increased, so as to increase the attention to the product phrase. The weight value can be specifically embodied in the process of calculating a vector of a subsequent content phrase. As shown in FIG. 6, when it is obtained by calculating that Y1 is "comfortable," degrees of correlation between "comfortable" and the vector of each product phrase in the historical product phrase sequence "Y-brand," "2017," "new-style," "spring clothing," "women's wear," "Korean fashion," "skinny," "slim," "silk," "one-piece dress," "A-line skirt," and "large sizes available" is calculated respectively according to the Attention mechanism. The degree of correlation can include a distance between the vectors. It can be found according to the histogram shown in FIG. 6 that the value of the degree of correlation between "comfortable" and "silk" in the above product phrases is maximum, that is, when the next step of decoding is performed and a vector of a subsequent content phrase is acquired, "silk" can be given more consideration. By adding the values of the degrees of correlation into the hidden vectors, output of the hidden vectors can be affected, that is, the output quality of the output sequence is improved.

In some embodiments, some entity information in the product description information needs to be completely displayed in content, for example, product brand name, person name, place name, trademark, date and other information. For example, for the brand name Michael Kors, if the decoder outputs the content phrase "Michael" in the brand name in the process of generating content, a subsequent content phrase output by the decoder is "Kors" theoretically so as to ensure the integrity of the output brand name.

Based on this, in some embodiments of the present application, a Copying mechanism can be used so as to ensure the integrity of some fixed information in the above scenario. For example, in the Copying mechanism, whether a subsequent content phrase output by the decoder is generated by copying or can automatically be calculated, and this can be judged specifically based on a reuse probability and a generation probability. When the reuse probability is greater than the generation probability, it can be determined that the subsequent content phrase output is generated by copying. For example, with respect to the above example, when a subsequent content phrase of the content phrase "Michael" is calculated, it can be obtained that the reuse probability is greater than the generation probability, that is, it is possible to copy the subsequent product phrase "Kors" of "Michael" from the product description information to serve as the subsequent content phrase that is to be output by the decoder, so as to ensure the integrity of the output. In this embodiment, after the seq2seq model component is trained, the model component further needs to be tested. It can be found that a known input historical product phrase sequence and a known output historical content phrase sequence exist in the training process, but no known output sequence exists in the testing process. Such a phenomenon can lead to different parameter dependences in the decoding part of the training process and the decoding part of the testing process. In other words, in the training process, an input term in the decoding process is an expected output (e.g., a known output vector) of the previous output phrase, but also is a predicted output of the previous output phrase at the testing stage; this results in inconsistency of input dependence distributions in the training stage and the testing stage. Therefore, in some embodiments of the present application, the seq2seq model component can be trained by using an annealing training method. For example, in the process of annealing training by using Data as Demonstrator (DAD), an input term can be randomly selected to be an expected output or a predicted output of the previous term. This model is trained by using a phrase sequence corresponding to the historical content at the beginning. With the deepening of the training, the training probability of the phrase sequence corresponding to the historical content is gradually reduced, until the model finally does not need the phrase sequence corresponding to the historical content. Definitely, in other embodiments, the seq2seq model component can also be trained by using multiple annealing training methods such as XENT (cross entropy) and XENT to XENT to solve the problem of different parameter dependences in the decoding part of the training process and the decoding part of the testing process.

In some embodiments of the present application, the number of words in the generated content can further be limited. Specifically, in the process of training the seq2seq model component, a content end identifier, for example, an identifier <\EOS> can be set at the decoding part. If the length of the content is limited to 10 words, the content end identifier can be set at the position of the 10th word. After the content end identifier has been set, a distance between a current output vector and the content end identifier can be calculated in the decoding process to monitor in real time whether the number of words of the current content exceeds the limit.

By using a deep neural network, deep learning can be carried out not only on product titles, labels and historical content, but also on detailed product description information and historical content. The detailed product description information can include product brief introduction, product details, etc. In a specific processing procedure, the product brief introduction and the product details often include more information than product titles or labels. In an example, product description information of a decorative picture is "Brand: XX picture, Picture Number: three and more, Painting Material: canvas, Mounting Manner: framed, Frame Material: metal, Color Classification: A—*Cercidiphyllum japonicum* leaf, B—*Sansevieria trifasciata* Prain, C—*Sansevieria trifasciata* Prain, D—*Drymoglossum subcordatum*, E—*Monstera* leaf, F—phoenix tree leaf, G—*Parathelypteris glanduligera*, H—japanese banana leaf, I—silver-edged round-leaf araliaceae *polyscias fruticosa*, J—spruce leaf, Style: modern simplicity, Process: spraying, Combining Form: single price, Picture Form: planar, Pattern: plants and flowers, Size: 40*60 cm 50*70 cm 60*90 cm, Frame Type: shallow wooden aluminum alloy frame, black aluminum alloy frame, Article Number: 0739." According to the statistics on historical user data, a historical content corresponding to the product description information of the decorative picture is set as "Minimalism style. Back to simplicity." Then, deep learning can be carried out on the detailed product description information and the historical content in a manner the same as that in the aforesaid embodiments. It should be noted that, in the process of selecting phrases matched with the product description information, redundant information in the product description information can be removed, and keywords having actual meanings are extracted from the product description information, such as brand terms, material phrases and core terms. For example, phrases that can be extracted from the product description information of the decorative picture can include "three," "canvas," "framed," "metal frame," "spraying," "planar," "plants and flowers," "aluminum alloy," and the like.

Figure 7:
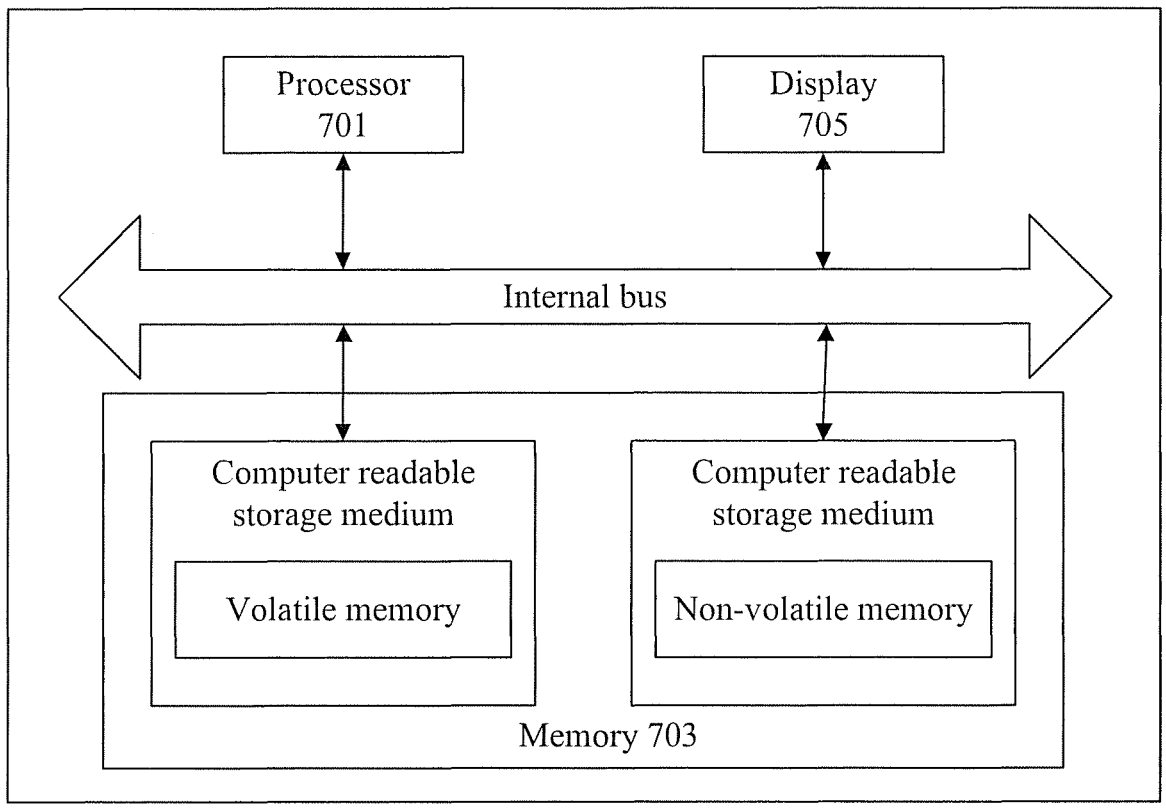
FIG. 7 is a schematic modular structure diagram of an exemplary content generation apparatus, according to embodiments of the present application.

In another aspect, the present application further provides a content generation apparatus. FIG. 7 illustrates a schematic diagram of an exemplary content generation apparatus 700, according to embodiments of the present application. As shown in FIG. 7, content generation apparatus 700 can include a processor 701 and a memory 703 configured to store processor executable instructions. Memory 703 can include non-transitory computer readable storage media. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Content generation apparatus 700 can also include a display 705 for displaying the content. When the instructions are executed, the processor can implement: acquiring product description information; selecting, by using a deep neural network model component, a content phrase matched with the product description information, wherein the deep neural network model component is obtained by training according to a plurality of pieces of historical product description information and historical content of the historical product description information; and constructing and generating content of the product description information based on the selected content phrase.

In some embodiments, the deep neural network model component can be configured to be obtained by: acquiring a plurality of pieces of historical product description information and historical content of the historical product description information; constructing a deep neural network model component, the deep neural network model component being provided with training parameters; and training the deep neural network model component by using corresponding relations between the plurality of pieces of historical product description information and the historical content respectively, and adjusting the training parameters until the deep neural network model component meets preset requirements.

In some embodiments, the step of training the deep neural network model component by using corresponding relations between the plurality of pieces of historical product description information and the historical content respectively can include: extracting at least one product phrase from the historical product description information to form a historical product phrase sequence; extracting at least one content phrase from the historical content to form a historical content phrase sequence; and adjusting the training parameters using the historical product phrase sequence as input data of the deep neural network model component and the historical content phrase sequence as output data of the deep neural network model component, until the deep neural network model component meets the preset requirements.

In some embodiments, the deep neural network model component can include one of the following: a seq2seq model component, and a seq2seq and Attention mechanism model component.

In some embodiments, the step of selecting, by using a deep neural network model component, a content phrase matched with the product description information can include: extracting at least one product phrase from the product description information, converting the product phrase into a product phrase vector, and forming a product phrase vector sequence corresponding to the product description information; and inputting the product phrase vector sequence into the deep neural network model component, and obtaining at least one content phrase by calculation according to the product phrase vector sequence and the training parameters.

In some embodiments, the step of inputting the product phrase vector sequence into the deep neural network model component, and obtaining at least one content phrase by calculation according to the product phrase vector sequence and the training parameters can include: obtaining a single content phrase vector by calculation according to the product phrase vector sequence and the training parameters; calculating the value of a degree of correlation between the content phrase vector and the product phrase vector respectively; and setting a weight value of the product phrase vector respectively according to the value of the degree of correlation, the weight value being used to calculate a subsequent content phrase vector.

In some embodiments, the seq2seq and Attention mechanism model component includes an encoder and a decoder, and the step of training the deep neural network model component by using corresponding relations between the plurality of pieces of historical product description information and the historical content respectively includes: acquiring an output phrase generated by the decoder and a historical product phrase matched with the output phrase; calculating a reuse probability and a generation probability of the output phrase; and using a subsequent phrase of the historical product phrase as a subsequent output phrase of the decoder when the reuse probability is greater than the generation probability.

In some embodiments, the step of constructing and generating content of the product description information based on the selected content phrase includes: inputting the selected content phrase into a language model for processing and generating content that conforms to a preset language rule.

In some embodiments, after the step of constructing and generating content of the product description information, the method further includes: displaying the content.

Some embodiments of the application further provide another content generation apparatus. The apparatus can include a processor and a memory configured to store processor executable instructions. When the instructions are executed, the processor implements: acquiring product description information; selecting, by using a deep neural network model component, a content phrase matched with the product description information, wherein the deep neural network model component is obtained by training according to a plurality of pieces of historical product description information and historical content of the historical product description information; and constructing and generating a plurality of content of the product description information based on the selected content phrase.

In some embodiments, after implementing the step of constructing and generating content of the product description information, the processor further implements the following steps: displaying content; acquiring a user's operational behavior on the content; and feeding back the operational behavior to the deep neural network model component for deep learning.

The present application provides operation steps of the method as described in the embodiments or flowchart. However, more or fewer operation steps can be included based on regular labor or without creative labor. A step order listed in the embodiments is merely one of multiple orders of executing the steps and does not represent a unique execution order. When performed in an actual apparatus or client terminal product, the steps can be performed according to the method order shown in the embodiments or accompanying drawing or performed in parallel (e.g., using parallel processors or in an environment of multi-thread processing).

It is appreciated that, in addition to implementing the controller by using pure computer readable program codes, the steps of the method can be logically programmed to enable the controller to implement the same function in the form of a logic gate, a switch, an application specific integrated circuit, a programmable logic controller and an embedded microcontroller. Therefore, such a controller can be considered a hardware component, and apparatuses included therein and configured to implement various functions can also be considered structures inside the hardware component. Moreover, the apparatuses can further be configured to implement various functions and considered as both software modules for implementing the method and structures inside the hardware component.

The present application can be described in a common context of a computer executable instruction executed by a computer, for example, a program module. Generally, the program module includes a routine, a program, an object, an assembly, a data structure, a class, and the like for executing a specific task or implementing a specific abstract data type. The present application can also be implemented in a distributed computing environment, and in the distributed computer environment, a task is executed by using remote processing devices connected through a communications network. In the distributed computer environment, the program module can be located in a local and remote computer storage medium including a storage device.

From the description of the implementation methods above, those skilled in the art can understand that the present application can be implemented by software plus a necessary universal hardware platform. Based on such understanding, the technical solutions in the embodiments of the present application can essentially, or the portion contributing to the prior art, be embodied in the form of a software product. The computer software product can be stored in a storage medium, such as a Read-Only Memory (ROM)/Random Access Memory (RAM), a magnetic disk, or an optical disc, and include several instructions that enable a computer device (which may be a personal computer, a mobile terminal, a server, a network device, etc.) to execute the method in the embodiments or certain portions of the embodiments of the present application.

The embodiments in the specification are described progressively, identical or similar parts of the embodiments may be obtained with reference to each other, and each embodiment emphasizes a different part than the other embodiments. The present application is applicable to various universal or dedicated computer system environments or configurations, such as, a personal computer, a server computer, a handheld device or a portable device, a tablet device, a multi-processor system, a microprocessor-based system, a set top box, a programmable electronic device, a network PC, a minicomputer, a mainframe computer, and a distributed computing environment including any of the above systems or devices.

Although the present application is described through embodiments, those of ordinary skill in the art should know that the present application has many variations and changes without departing from the spirit of the present application, and it is expected that the appended claims cover the variations and changes without departing from the spirit of the present application.

What is claimed is:

1. A content generation method, comprising:
acquiring product description information;
selecting, by using a deep neural network model component, a content phrase matched with the product description information, wherein the deep neural network model component is obtained by training according to a plurality of pieces of historical product description information and historical content of the historical product description information;
generating content corresponding to the product description information based on the selected content phrase, wherein
the deep neural network model component comprises at least one of a Sequence to Sequence (seq2seq) model component or a Sequence to Sequence and Attention mechanism (seq2seq and Attention mechanism) model component;
displaying the content;
acquiring a user's operational behavior on the displayed content; and
feeding back the operational behavior to the deep neural network model component for deep learning.

2. The method according to claim 1, wherein the deep neural network model component is trained by:
acquiring historical product description information and historical content associated with the historical product description information;
generating training parameters based on the historical product description information and the historical content; and
training the deep neural network model component by the training parameters.

3. The method according to claim 2, wherein generating the training parameters based on between the historical product description information and the historical content further comprises:
generating a historical product phrase sequence by extracting at least one product phrase from the historical product description information;
generating a historical content phrase sequence by extracting at least one content phrase from the historical content; and
adjusting the training parameters using the historical product phrase sequence as an input and the historical content phrase sequence as an output.

4. The method according to claim 2, wherein selecting the content phrase matched with the product description information comprises:
extracting at least one product phrase from the product description information,
converting the product phrase into a product phrase vector;
generating a product phrase vector sequence based on the product phrase vector; and
obtaining at least one content phrase, via the deep neural network model component, according to the product phrase vector sequence and the training parameters.

5. The method according to claim 4, wherein obtaining the at least one content phrase, via the deep neural network model component, according to the product phrase vector sequence and the training parameters further comprises:
generating a first content phrase vector according to the product phrase vector sequence and the training parameters;
determining a correlation degree between the content phrase vector and the product phrase vector; and
determining a weight value of the product phrase vector according to the correlation degree for a second content phrase vector.

6. The method according to claim 2, wherein the seq2seq and Attention mechanism model component comprises an encoder and a decoder, and training the deep neural network model component by the training parameters further comprises:
acquiring an output phrase generated by the decoder and a historical product phrase matched with the output phrase;
determining a reuse probability and a generation probability of the output phrase; and
using a subsequent phrase of the historical product phrase as a subsequent output phrase of the decoder when the reuse probability is greater than the generation probability.

7. The method according to claim 1, wherein generating the content corresponding to the product description information based on the selected content phrase further comprises:
inputting the selected content phrase into a language model; and
generating the content that conforms to a preset language rule of the language model.

8. A content generation apparatus, comprising:
a memory storing a set of instructions; and
at least one processor configured to execute the set of instructions to cause the apparatus to perform:
acquiring product description information;
selecting, by using a deep neural network model component, a content phrase matched with the product description information, wherein the deep neural network model component is obtained by training according to a plurality of pieces of historical product description information and historical content of the historical product description information;
generating content corresponding to the product description information based on the selected content phrase, wherein
the deep neural network model component comprises at least one of a Sequence to Sequence (seq2seq) model component or a Sequence to Sequence and Attention mechanism (seq2seq and Attention mechanism) model component;
displaying the content;
acquiring a user's operational behavior on the displayed content; and feeding back the operational behavior to the deep neural network model component for deep learning.

9. A non-transitory computer readable medium that stores a set of instructions that is executable by at least one processor of a computer system to cause the computer system to perform a content generation method, the method comprising:
    acquiring product description information;
    selecting, by using a deep neural network model component, a content phrase matched with the product description information, wherein the deep neural network model component is obtained by training according to a plurality of pieces of historical product description information and historical content of the historical product description information;
    generating content corresponding to the product description information based on the selected content phrase, wherein
    the deep neural network model component comprises at least one of a Sequence to Sequence (seq2seq) model component or a Sequence to Sequence and Attention mechanism (seq2seq and Attention mechanism) model component;
    displaying the content;
    acquiring a user's operational behavior on the displayed content; and
    feeding back the operational behavior to the deep neural network model component for deep learning.

10. The non-transitory computer readable medium according to claim 9, wherein the deep neural network model component is trained by:
    acquiring historical product description information and historical content associated with the historical product description information;
    generating training parameters based on between the historical product description information and the historical content; and
    training the deep neural network model component by the training parameters.

11. The non-transitory computer readable medium according to claim 10, wherein generating the training parameters based on between the historical product description information and the historical content further comprises:
    generating a historical product phrase sequence by extracting at least one product phrase from the historical product description information;
    generating a historical content phrase sequence by extracting at least one content phrase from the historical content; and
    adjusting the training parameters using the historical product phrase sequence as an input and the historical content phrase sequence as an output.

12. The non-transitory computer readable medium according to claim 10, wherein selecting the content phrase matched with the product description information comprises:
    extracting at least one product phrase from the product description information,
    converting the product phrase into a product phrase vector;
    generating a product phrase vector sequence based on the product phrase vector; and
    obtaining at least one content phrase, via the deep neural network model component, according to the product phrase vector sequence and the training parameters.

13. The non-transitory computer readable medium according to claim 12, wherein obtaining the at least one content phrase, via the deep neural network model component, according to the product phrase vector sequence and the training parameters further comprises:
    generating a first content phrase vector according to the product phrase vector sequence and the training parameters;
    determining a correlation degree between the content phrase vector and the product phrase vector; and
    determining a weight value of the product phrase vector according to the correlation degree for a second content phrase vector.

14. The non-transitory computer readable medium according to claim 10, wherein the seq2seq and Attention mechanism model component comprises an encoder and a decoder, and training the deep neural network model component by the training parameters further comprises:
    acquiring an output phrase generated by the decoder and a historical product phrase matched with the output phrase;
    determining a reuse probability and a generation probability of the output phrase; and
    using a subsequent phrase of the historical product phrase as a subsequent output phrase of the decoder when the reuse probability is greater than the generation probability.

15. The non-transitory computer readable medium according to claim 9, wherein generating the content corresponding to the product description information based on the selected content phrase further comprises:
    inputting the selected content phrase into a language model; and
    generating the content that conforms to a preset language rule of the language model.

* * * * *